United States Patent
Fax

(10) Patent No.: US 9,341,482 B2
(45) Date of Patent: May 17, 2016

(54) EFFICIENT PROCESSING OF DOUBLE DIFFERENCED UPDATES IN A KALMAN FILTER

(71) Applicant: J. Alexander Fax, Los Angeles, CA (US)

(72) Inventor: J. Alexander Fax, Los Angeles, CA (US)

(73) Assignee: Northrop Grumann Systems Corporation, Falls Church, VA (US)

( * ) Notice: Subject to any disclaimer, the term of this patent is extended or adjusted under 35 U.S.C. 154(b) by 65 days.

(21) Appl. No.: 14/496,920

(22) Filed: Sep. 25, 2014

(65) Prior Publication Data

US 2016/0091314 A1    Mar. 31, 2016

(51) Int. Cl.
*G01C 21/00* (2006.01)

(52) U.S. Cl.
CPC ...................... *G01C 21/00* (2013.01)

(58) Field of Classification Search
CPC ....................................................... G01C 21/00
USPC ........................................................ 701/400
See application file for complete search history.

(56) References Cited

U.S. PATENT DOCUMENTS

| | | | |
|---|---|---|---|
| 5,451,964 A * | 9/1995 | Babu .................. | 342/357.31 |
| 7,961,145 B1 * | 6/2011 | Strus et al. ............. | 342/357.34 |
| 2002/0165669 A1 * | 11/2002 | Pinto et al. ................. | 701/213 |

FOREIGN PATENT DOCUMENTS

EP        0 728 313        8/1996

* cited by examiner

*Primary Examiner* — Fadey Jabr
*Assistant Examiner* — Aaron L Troost
(74) *Attorney, Agent, or Firm* — Tarolli, Sundheim, Covell & Tummino LLP

(57) ABSTRACT

Systems and methods are provided for sequentially updating a Kalman filter in a navigation system. Respective signals from a plurality of transmitters containing range-finding data are received at a plurality of antennas. For each of the plurality of transmitters, a single differenced observable is calculated between a given pair of the plurality of antennas. A common bias, stored as a state in a Kalman filter, is subtracted from the calculated single differenced observable for each of the plurality of transmitters to provide respective double differenced residual values. A plurality of states stored in the Kalman filter are updated using the double differenced residual values.

17 Claims, 2 Drawing Sheets

US 9,341,482 B2

EFFICIENT PROCESSING OF DOUBLE DIFFERENCED UPDATES IN A KALMAN FILTER

FIELD OF THE INVENTION

The invention relates generally to range finding systems, which can include Global Navigation Satellite Systems (GNSS) Receivers. More specifically, the invention relates to efficient processing of double differenced updates in a Kalman filter.

BACKGROUND OF THE INVENTION

In range finding applications, a receiver can utilize information extracted from messages received from one or more transmitters to determine the transit time of each message. A distance to each transmitter can be determined from the transit time given the known propagation speed of electromagnetic radiation, and a position of the receiver, at least relative to the transmitters, can be determined via triangulation. One example of a range finding application is the Global Positioning System.

SUMMARY OF THE INVENTION

In accordance with an aspect of the present invention, a method is provided for sequentially updating a Kalman filter in a navigation system. Respective signals from a plurality of transmitters containing range-finding data are received at a plurality of antennas. For each of the plurality of transmitters, a single differenced observable is calculated between a given pair of the plurality of antennas. A common bias, stored as a state in a Kalman filter, is subtracted from the calculated single differenced observable for each of the plurality of transmitters to provide respective double differenced residual values. A plurality of states stored in the Kalman filter are updated using the double differenced residual values.

In accordance with another aspect of the present invention, a navigation system includes a plurality of antennas configured to receive signals from a plurality of transmitters and a signal processor configured to calculate, for each of the plurality of transmitters, a single differenced observable between a given pair of the plurality of antennas. A Kalman filter is configured to track a position of at least one of the plurality of antennas, the Kalman filter storing and sequentially updating at least a plurality of position states and at least one state representing a common bias across the plurality of transmitters.

In accordance with still another aspect of the present invention, a non-transitory computer readable medium stores executable instructions for sequentially updating a position associated with an antenna. The instructions are executable to provide a signal processor configured to calculate, for each of a plurality of transmitters, a single differenced observable between the antenna and at least one remote antenna and a Kalman filter configured to track the position of the antenna. The Kalman filter stores and sequentially updates at least a plurality of position states and at least one state representing a common bias across the plurality of transmitters.

BRIEF DESCRIPTION OF THE DRAWINGS

The features, objects, and advantages of the invention will become more apparent from the detailed description set forth below when taken in conjunction with the drawings, wherein.

DETAILED DESCRIPTION OF THE INVENTION

In accordance with an aspect of the present invention, systems and methods are provided for providing sequential updates of uncorrelated range finding measurements to a Kalman filter with an accuracy associated with double-differenced observables. The systems and methods described herein utilize an additional state, representing a common transmitter clock bias, as a vehicle for accounting for the common error in single-differenced observables from a plurality of transmitters, allowing the system to maintain the common error at an appropriately small value for the Kalman filter to produce a solution equivalent to a double-differenced model. Accordingly, the position can be tracked with the high accuracy associated with double-differenced model while using sequential updating and uncorrelated measurements.

Figure 1:
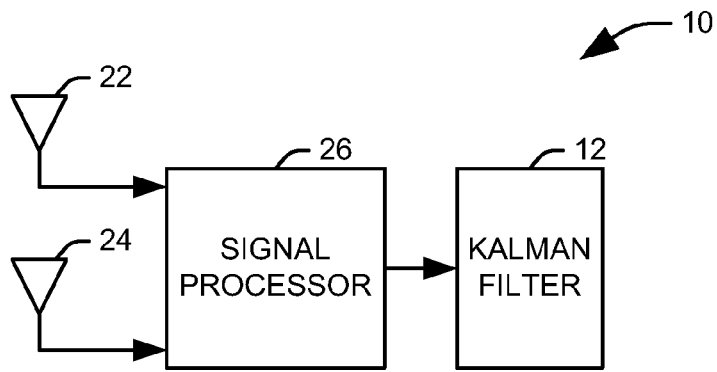
FIG. 1 illustrates one example of a navigation system utilizing a Kalman filter system in accordance with an aspect of the present invention.

FIG. 1 illustrates one example of a navigation system 10 utilizing a Kalman filter system 12 in accordance with an aspect of the present invention. The range finding system 10 includes at least two antennas 22 and 24 configured to receive signals from a plurality of transmitters. In general, each antenna will be associated with a specific receiver platform, but it will be appreciated that in some applications, a single platform may have multiple, and even redundant, antennas to allow for integrity monitoring of the signals received at the antennas. Each of these signals will generally contain a structured or pseudo-random code that can be used for determining a time-of-flight for the signal. The received signals are processed at an associated signal processor 26 that calculates a single differenced observable between a given pair of the at least two antennas for each of the plurality of transmitters.

The calculated single-differenced observables are provided to the Kalman filter assembly 12. In accordance with an aspect of the present invention, the Kalman filter 12 includes, in addition to a plurality of position states, at least one state representing a common bias, such as a clock bias, across the plurality of transmitters. At each update of the filter, the common bias can be subtracted from the single differenced observable for each of the plurality of transmitters to an equivalent result to the application of double differenced observations. In one example, the common bias state can be added back on to a plurality of channel state estimates via an observation model for the Kalman filter 12, which are then subtracted from the singled differenced observables to form appropriate measurement residuals for updating the estimated Kalman state.

The Kalman filter 12 is maintained such that the covariance associated with the state estimate is maintained at a very large value, such that the stored state will have little influence on a next state estimate of clock bias. Accordingly, the common bias is not tracked over time, but included in the Kalman model as a vehicle for applying sequential updates having the accuracy of a double differenced update. With each sequential update, a new value for the common bias can be determined, either from the receiver's own estimate of the clock bias or from a separate computation from the pseudorange data calculated from each channel. Since the variance associated with the state is maintained at the large value, the estimate for the state is effective a function solely of the provided measurement.

Figure 2:
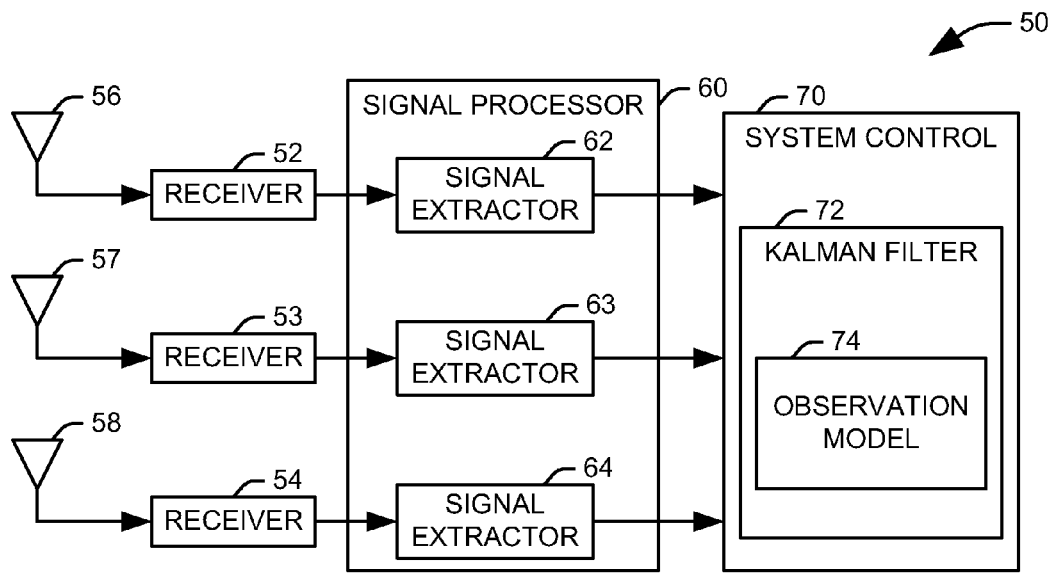
FIG. 2 illustrates one implementation of a global navigation satellite system utilizing a sequentially updating, double differenced Kalman filter in accordance with an aspect of the present invention.

FIG. 2 illustrates one implementation of a global navigation satellite system (GNSS) 50 utilizing a sequentially updating, double differenced Kalman filter in accordance with an aspect of the present invention. In the illustrated implementation, a plurality of receivers 52-54 detect a navigation signal provided by one or more GNSS satellites. At each receiver 52-54, the incoming satellite signals are received by one or more elements on a multi-element GPS antenna 56-58 and converted into usable signals. For example, the receivers 52-54 can include a multi-channel RF front-end that downconverts the received signal to baseband. In one implementation, a first antenna (e.g., 56) can be located on an aircraft and a second antenna (e.g., 57) can be located on an air-to-air refueling platform. Alternatively, the first antenna can be located on the aircraft and a second antenna can be located on an aircraft carrier.

The downconverted signals are then digitized and provided to signal processor 60 comprising a plurality of signal extractors 62-64. The signal extractors 62-64 can include correlators configured to search the Doppler and delay correlation space for the strongest correlation energy indicating the presence of an incoming signal. The correlators can be setup to provide localized correlation values at points surrounding the acquired signals, which then allows signal tracking. Once the signal is located by the correlators, range finding information is extracted from the signal, making it possible to determine a time of transit of the signal, and thus a pseudorange to the transmitter from each receiver 52-54.

The extracted range finding information can include a code pseudorange, which is the "distance" between the transmitter at some transmit time and the receiver at some receive time. Because the transmit time and the receive time are different, it is impossible to measure the true range between the satellite and the receiver. A phase pseudorange is based on the carrier phase of the signal and does not require the actual information being transmitted. To determine the phase pseudorange, a fractional beat phase of the received signal with a signal from a local oscillator having known properties can be measured and converted into a pseudorange by scaling the measured beat with the wavelength.

A system control 70 includes a relative Kalman filter 72 that maintains an estimate of the position of at least one of the receivers 52-54 based upon observations, specifically, single-differenced pseudorange measurements for each transmitter, provided by the signal extractors 60-62. In one implementation, the observations can include acceleration measurements from an inertial navigation system (not shown) as well as the single-differenced pseudorange measurements provided by the signal extractors. It will be appreciated that the system control 70 can be located at one of the receivers (e.g., 52), distributed among the plurality of receivers 52-54, or located remotely. In the illustrated implementation, the Kalman filter 72 estimates at least a plurality of position states, a plurality of velocity states, a plurality of channel states, and a state representing a common bias, such as a clock bias, across the plurality of transmitters.

The Kalman filter 72 includes an observation model 74 that transforms the Kalman states into an observation domain, such that a set of residuals can be taken with a set of observations taken from instrumentation at the receivers 52-54. In accordance with an aspect of the present invention, the observation model 74 can be configured such that the state representing the common bias across the transmitters is added back to the stored receiver and channel states to form values corresponding to the single-differenced pseudorange measurements. In other words, the product of the observation model and the state estimates includes the sum of the stored states and the common bias, and the common bias is thus subtracted from the observations as part of the normal operation of the Kalman filter 72. The filter 72 can then be updated with the resulting residual values, which are effectively double-differenced.

The observations themselves are therefore uncorrelated, such that the observation covariance matrix does not require off-diagonal terms. As long as the covariance of the common bias state is maintained at a large value and corrected common error is kept relatively small, the system 50 is equivalent to a double-differenced solution without the need for batch updates or the removal of off-diagonal elements from the covariance matrix associated with the measurements. To this end, the system control 70 can be configured to replace the value of the common bias state with a value calculated at the signal processor after updating the plurality of states stored in the Kalman filter. Alternatively, the system control 70 can reset a value associated within the common bias state within a process noise covariance matrix associated with the Kalman filter to a default value, such that the new state estimate for the common bias is generated entirely or nearly entirely from the observations. This allows the system 50 to maintain the accuracy associated with double-differenced operation while still utilizing sequential updates of the Kalman filter 72.

Figure 3:
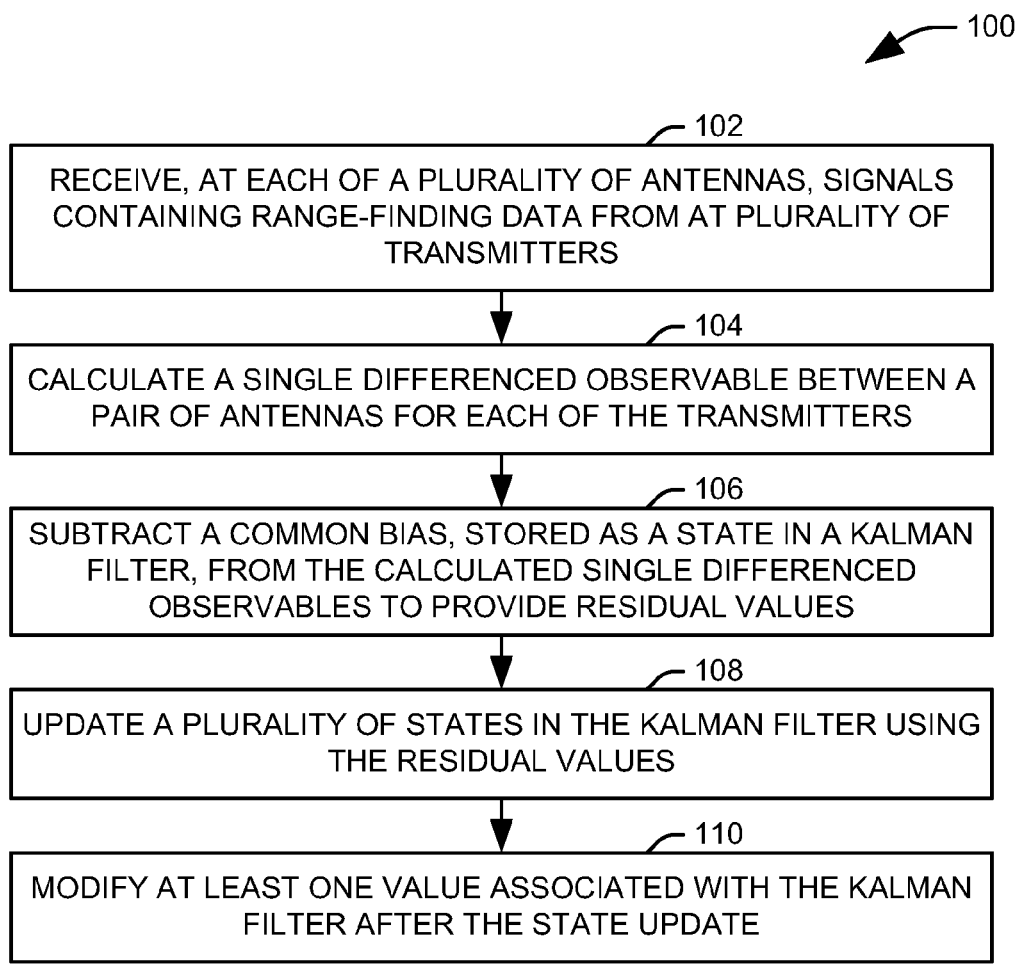
FIG. 3 illustrates a method for providing sequential updates to a Kalman filter in a navigation system in accordance with an aspect of the present invention.

In view of the foregoing structural and functional features described above, an example method will be better appreciated with reference to FIG. 3. While, for purposes of simplicity of explanation, the method of FIG. 3 is shown and described as executing serially, it is to be understood and appreciated that the present invention is not limited by the illustrated order, as some actions could, in other examples, occur in different orders from that shown and described herein or could occur concurrently.

FIG. 3 illustrates a method 100 for providing sequential updates to a Kalman filter in a navigation system in accordance with an aspect of the present invention. At 102, signals from a plurality of transmitters containing range-finding data are received at a plurality of antennas. Accordingly, at each of the plurality of antennas, range-finding data from the transmitters can be processed at an associated receiver to generate observables, such as code or phase pseudorange values, from the range-finding data. At 104, a single differenced observable between a given pair of the plurality of antennas is calculated for each of the plurality of transmitters. For example, each antenna can have at least one paired antenna for which a baseline is known, and the single differenced observable can be calculated from the paired antennas. Alternatively, one antenna can be used as a reference for all of the other antennas.

At 106, a common bias, stored as a state in a Kalman filter, is subtracted from the calculated single differenced observable for each of the plurality of transmitters to provide respective double differenced residual values. For example, an observation matrix can be applied to the stored plurality of states such that a resulting product includes the sum of the stored states and the common bias, and that product can be subtracted from the calculated single differenced observables to provide the residual values. At 108, a plurality of states stored in the Kalman filter are updated using the double differenced residual values. For example, a product of the residual values and a matrix representing the Kalman filter gain can be added to the existing state estimates, and the covariance matrix associated with the state estimate can be updated accordingly.

At 110, at least one value associated with the Kalman filter is modified after the states are updated. In one implementation, a value associated within the common bias state within the covariance matrix associated with the state estimate to a large, default value. By maintaining the covariance at a large value, the existing estimate is effectively disregarded, allowing the common bias state to be updated based completely or nearly completely on the single-differenced observations. In an alternate implementation, the value of the common bias state can instead be replaced with a calculated value after updating the plurality of states stored in the Kalman filter. For example, the value can be calculated at a receiver associated with one of the plurality of antennas. Regardless, an accurate summary of the common bias can be maintained to allow for generation of the double differenced residuals within the Kalman filter schema.

Figure 4:
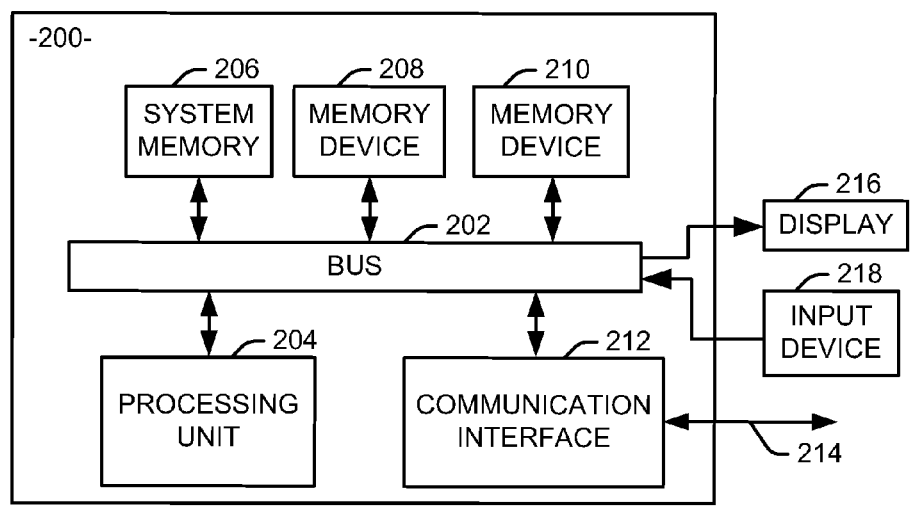
FIG. 4 is a schematic block diagram illustrating an exemplary system of hardware components capable of implementing examples of the systems and methods disclosed in FIGS. 1-3.

FIG. 4 is a schematic block diagram illustrating an exemplary system 200 of hardware components capable of implementing examples of the systems and methods disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a navigation system in accordance with the present invention. Computer executable logic for implementing the composite applications testing system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution.

The invention has been disclosed illustratively. Accordingly, the terminology employed throughout the disclosure should be read in an exemplary rather than a limiting manner. Although minor modifications of the invention will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

I claim:

1. A method for providing sequential updates to a Kalman filter in a navigation system comprising:
   receiving respective signals from a plurality of transmitters containing range-finding data at a plurality of antennas;
   calculating, for each of the plurality of transmitters, a single differenced observable between a given pair of the plurality of antennas;
   subtracting a common bias, stored as a state in a Kalman filter, from the calculated single differenced observable for each of the plurality of transmitters to provide respective double differenced residual values; and
   updating a plurality of states stored in the Kalman filter using the double differenced residual values.

2. The method of claim 1, further comprising resetting a value associated within the common bias state within a covariance matrix associated with the Kalman filter to a default value.

3. The method of claim 1, wherein subtracting the common bias comprises applying an observation matrix to the stored plurality of states such that a resulting product includes the sum of the stored states and the common bias and subtracting the resulting product from the calculated single differenced observables.

4. The method of claim 1, further comprising replacing a value of the common bias state with a calculated value after updating the plurality of states stored in the Kalman filter.

5. The method of claim 4, further comprising calculating the calculated value at a receiver associated with one of the plurality of antennas.

6. A navigation system comprising:
   a plurality of antennas configured to receive signals from a plurality of transmitters;
   a signal processor configured to calculate, for each of the plurality of transmitters, a single differenced observable between a given pair of the plurality of antennas; and
   a Kalman filter configured to track a position of at least one of the plurality of antennas, the Kalman filter storing and sequentially updating at least a plurality of position states and at least one state representing a common bias across the plurality of transmitters, wherein sequentially updating the plurality of position states comprises subtracting a value of the common bias state from the single differenced observables and updating the Kalman filter with a resulting difference.

7. The navigation system of claim 6, the Kalman filter storing an observation covariance matrix, the observation covariance matrix having no off-diagonal terms.

8. The navigation system of claim 6, further comprising a system control configured to replace the value of the common bias state with a value calculated at the signal processor after updating the plurality of states stored in the Kalman filter.

9. The navigation system of claim 6, further comprising a system control configured to reset a value associated within the common bias state within an observation covariance matrix associated with the Kalman filter to a default value.

10. The navigation system of claim 6, the Kalman filter comprising an observation matrix configured such that when applied to the stored plurality of states, a resulting product includes the sum of the stored states and the common bias.

11. The navigation system of claim 6, wherein at least one of the plurality of antennas is located on an aircraft and at least one of the plurality of antennas is located on an air-to-air refueling platform.

12. The navigation system of claim 6, wherein at least one of the plurality of antennas is located on an aircraft and at least one of the plurality of antennas is located on an aircraft carrier.

13. A non-transitory computer readable medium storing executable instructions for sequentially updating a position associated with an antenna, the executable instructions comprising:

a signal processor configured to calculate, for each of a plurality of transmitters, a single differenced observable between the antenna and at least one remote antenna; and a Kalman filter configured to track the position of the antenna, the Kalman filter storing and sequentially updating at least a plurality of position states and at least one state representing a common bias across the plurality of transmitters, wherein sequentially updating the plurality of position states comprises subtracting a value of the common bias state from the single differenced observables and updating the Kalman filter with a resulting difference.

14. The navigation system of claim 13, the Kalman filter storing an observation covariance matrix, the observation covariance matrix having no off-diagonal terms.

15. The navigation system of claim 13, further comprising a system control configured to replace the value of the common bias state with a value calculated at the signal processor after updating the plurality of states stored in the Kalman filter.

16. The navigation system of claim 13, further comprising a system control configured to reset a value associated within the common bias state within an observation covariance matrix associated with the Kalman filter to a default value.

17. The navigation system of claim 13, the Kalman filter comprising an observation matrix configured such that when applied to the stored plurality of states, a resulting product includes the sum of the stored states and the common bias.

* * * * *